US010776089B1

(12) United States Patent
Farivar et al.

(10) Patent No.: US 10,776,089 B1
(45) Date of Patent: Sep. 15, 2020

(54) COMPUTER ARCHITECTURE BASED ON PROGRAM / WORKLOAD PROFILING (71) Applicant: Capital One Services, LLC, McLean, VA (US)

(72) Inventors: Reza Farivar, Champaign, IL (US); Austin Walters, Savoy, IL (US); Anh Truong, Champaign, IL (US); Jeremy Goodsitt, Champaign, IL (US); Vincent Pham, Champaign, IL (US); Galen Rafferty, Mahomet, IL (US); Mark Watson, Urbana, IL (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/664,316

(22) Filed: Oct. 25, 2019

(51) Int. Cl.
*G06F 8/41* (2018.01)
*G06N 20/00* (2019.01)
*G06F 9/455* (2018.01)

(52) U.S. Cl.
CPC .......... *G06F 8/443* (2013.01); *G06F 9/45525* (2013.01); *G06N 20/00* (2019.01)

(58) Field of Classification Search
None
See application file for complete search history.

(56) References Cited

U.S. PATENT DOCUMENTS

| 2003/0171907 | A1* | 9/2003 | Gal-On | G06F 8/447 703/14 |
| 2016/0378661 | A1* | 12/2016 | Gray | G06F 11/3024 712/237 |
| 2017/0195173 | A1* | 7/2017 | Izenberg | G06F 9/45558 |
| 2017/0364792 | A1 | 12/2017 | Chai et al. | |
| 2018/0307792 | A1* | 10/2018 | Kim | G03F 7/70433 |
| 2018/0314935 | A1* | 11/2018 | Lewis | G06N 3/0445 |
| 2018/0341851 | A1 | 11/2018 | Chung et al. | |
| 2019/0050715 | A1* | 2/2019 | Ooi | G06F 15/7892 |
| 2019/0324755 | A1* | 10/2019 | Herr | G06F 8/443 |

* cited by examiner

*Primary Examiner* — Daxin Wu
(74) *Attorney, Agent, or Firm* — Sterne, Kessler, Goldstein & Fox P.L.L.C.

(57) ABSTRACT

Disclosed herein are system, method, and computer program product embodiments for determining an appropriate FPGA for a particular computer program. An embodiment operates by a central processing unit's counter identifying a plurality of workload properties in processing a computer program, wherein the central processing unit is part of a first computer architecture. The central processing unit then sends the workload properties to a controller trained to identify a field-programmable gate array (FPGA) module based on the plurality of workload properties. The central processing unit thereafter receives a recommended FPGA module from the controller and implements the recommended FPGA module in a computer architecture for processing the computer program, whereby the second computer architecture is able to perform the computer program more efficiently than the first computer architecture.

20 Claims, 6 Drawing Sheets

FIG. 6

US 10,776,089 B1

COMPUTER ARCHITECTURE BASED ON PROGRAM / WORKLOAD PROFILING

BACKGROUND

Computer programs have different workload requirements based on their functionality. Workload pertains to an amount of work performed by a computing device or system to perform given functions. Example workload requirements include memory workload, central processing unit (CPU) workload, input-output (I/O) workload, and database workload, just to provide a few. Memory workload relates to an amount of memory required to perform an instruction over a period of time or at a specific instant in time. CPU workload relates to a number of instructions required to be executed during a given period or at a particular instant in time. I/O workload relates to combinations of received input and produced output required to be analyzed at a given time to ensure that appropriate load parameters are met. Database workload relates to an amount of a database utilized for performing instructions over a given time or at a specific time.

Because of varying workload requirements, computing devices may have insufficient processing capabilities to support certain computer programs. For example, the computing device's CPU may not have sufficient processing power for a computer program. Likewise, the computing device's storage unit may not have sufficient power for the computer program.

Moreover, it may not be clear whether a computer program, when launched, is able to support their processing requirements. Thus, computing devices may be deployed with insufficient processing power to support key computer programs.

Field Programmable Gate Arrays (FPGAs) are semiconductor devices that are based around a matrix of configurable logic blocks (CLBs) connected via programmable interconnects. FPGAs can be reprogrammed to the desired application or functionality requirements after manufacturing.

Modules can be implemented on FPGAs with specialized hardware designed to perform particular functions efficiently. Example FPGA modules utilize fast fourier transform (FFT), neural networks, and/or image processing. In this way, FPGAs permit a customer or a designer to specify a hardware design for specific processing requirements. Prior systems are unable to identify a proper FPGA module for different computer programs. As a result, even if computing devices are deployed with sufficient processing power to support key computer programs, the deployed FPGA module may be insufficient.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifiers the drawing in which the reference number first appears.

DETAILED DESCRIPTION

Provided herein is a way to identify an appropriate field-programmable gate array (FPGA) module for a specific computer program. In an embodiment, workload properties in processing a computer program are collected. The properties describe the performance of the computer program and the structure of the central processing unit. The plurality of workload properties is applied to a classifier trained to identify a field-programmable gate array (FPGA) module based on the plurality of workload properties. From the classifier, a recommended FPGA module is identified.

In an example embodiment, a system comprises a computing device and analyzing device. The computing device includes an operating system, a compiler, a memory, a central processing unit (CPU), a FPGA module, and/or a computer program module. As such, the computing device's computer program module processes a computer program. In doing so, the computing device's CPU, compiler, operating system, and/or computer program identifies workload properties in running the computer program and sends them to the analyzing device.

The analyzing device then determines appropriate classification modules based on the workload properties. For example, based on the workload properties, the analyzing device may classify the program as being memory intensive. In turn, the analyzing device may identify a class of FPGA modules that support memory-intensive computer programs. The analyzing device may then select a particular FPGA module from the class of FPGA modules. In doing so, the analyzing device may identify a specific FPGA module that meets or exceeds the remaining workload properties of the computer program. For example, the analyzing device may identify a specific FPGA module within the class of memory-intensive FPGA properties that supports the memory-bandwidth requirements of the computer program. Thereafter, the analyzing device may implement the FPGA module in computer architecture for processing the computer program.

As such, embodiments disclosed herein permit selection of an FPGA module based on workload properties of a computer program. The selected FPGA module thus has the appropriate architecture to support the computer program in its full capacity. Moreover, embodiments disclosed herein utilize a machine learning model to accurately select the appropriate FPGA module based on patterns and inferences drawn therein. Thus, embodiments disclosed herein are able to accurately select the FPGA module for computer programs having workload properties not previously received and/or analyzed.

Figure 1:
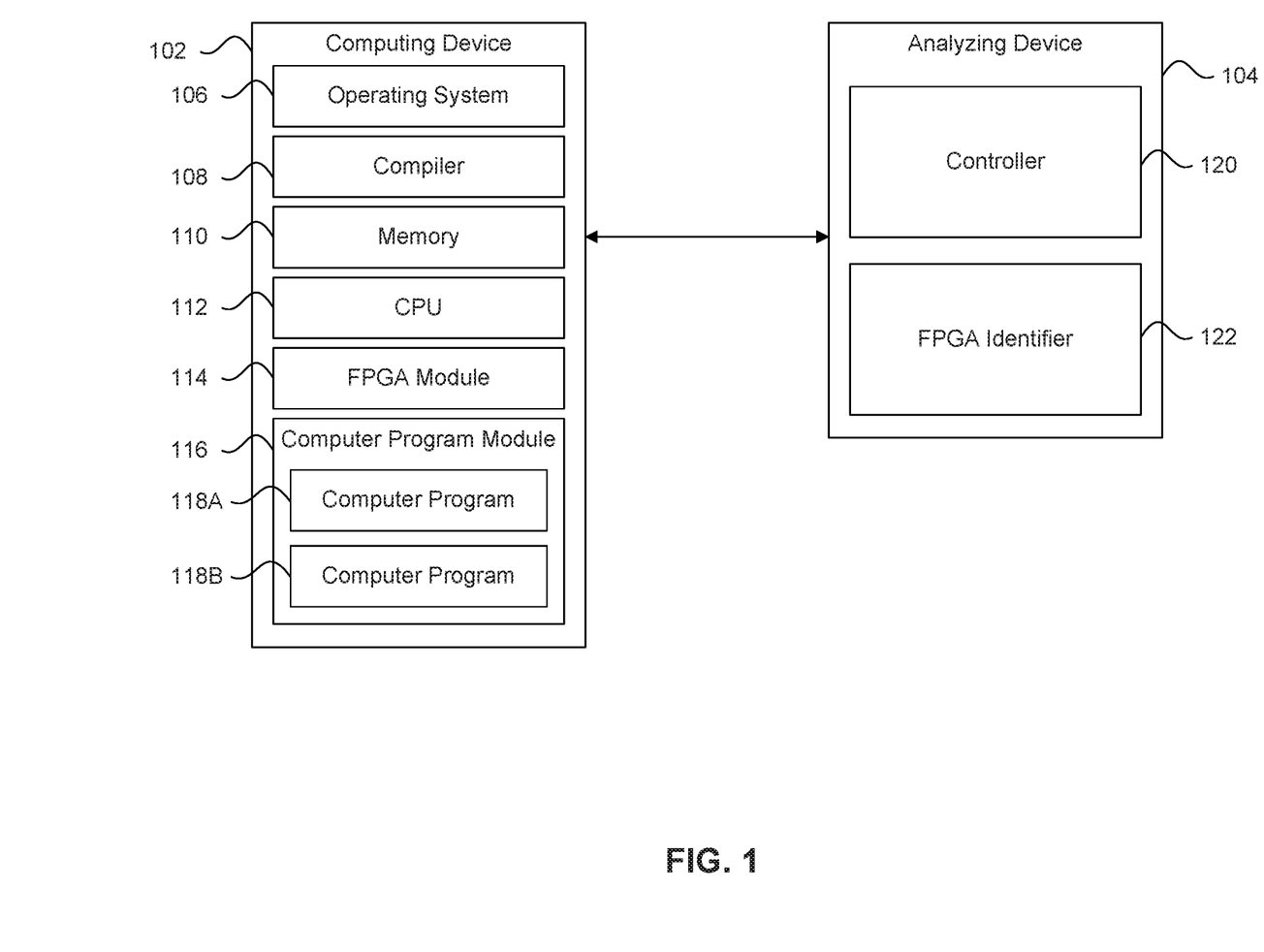
FIG. 1 illustrates a block diagram of a system for identifying an appropriate FPGA module for a computer program, according to some embodiments.

FIG. 1 illustrates a system 100 for determining an appropriate FPGA module for a particular computer program, according to some embodiments. System 100 includes computing device 102 and/or analyzing device 104. In some embodiments, system 100 includes both computer devices 102 and analyzing device 104.

Computer device 102 processes computer programs having different processing requirements. In some embodiments, computing device 102 is made up of a predefined computer architecture that executes different computer programs and conducts processing of them before their execution. Computing device 102 includes a computer architecture including operating system 106, compiler 108, memory 110, central processing unit 112, FPGA module 114, and/or computer program module 116. Operating system 106 may be any software managing computer device 100's hardware and software processes. As such, operating system 106's software may manage operations of compiler 108, memory 110, CPU 112, and/or computer program module 116's computer programs 118A-B. Operating system 106 may be Microsoft Windows, mac OS, and/or Linux, just to provide a few examples.

Analyzing device 104 identifies an appropriate FPGA module unique to a particular computer program of computing device 102 based on the computing device 102's workload properties in processing the computer program. Analyzing device 104 identifies an appropriate FPGA module for a computer architecture to process a particular computer program having specific processing requirements. Analyzing device 104 thus recommends that this FPGA module be utilized in a specific computer architecture when the computer program is deployed. As such, the specific computer architecture processes the computer program better and more efficiently than the computer architecture utilized before deployment.

Returning to computing device 102, compiler 108 translates computer code from a programming language into machine instructions that can be executed by a processor (such as x86 instructions) or a virtual machine (such as bytecodes executable by Java Virtual Machine). In particular, compiler 108 may translate computer codes of computer programs 118A-B as required by computing device 100 for processing. Along these lines, compiler 108 may process/translate computer codes at various times. Thus, compiler 108 may be a just-in-time compiler, an ahead-of-time compiler, a source-to-source compiler, and a dynamic compiler.

During the compilation process, compiler 108 may identify that the compiled program uses specialized computational kernels. Examples include matrix multiplication techniques, digital signal processing (DSP) techniques such as FFT techniques, neural network processing algorithms that can benefit from specialized hardware-based tensor processing modules, and video processing algorithms such as MPEG compression.

Memory 110 stores information for computing device 100, such as information associated with computer programs 118A-B. Memory 110 may be volatile (e.g., RAM) or non-volatile (e.g., ROM or NVRAM). CPU 112 carries out instructions specified by computer programs 118A-B. CPU 112 utilizes a clock signal to pace their operations.

FPGA module 114 is a semiconductor device based around a matrix of configurable logic blocks (CLBs) connected via programmable interconnects. Libraries are available specifying hardware configurations that can be implemented in FPGA. These libraries specify machine architectures that have different parameters. The architectural parameters can include, for example, bus width (e.g., 8, 16, 32, 64, 128 bits), a number of available registers (e.g., 2, 4, 8, 62, and 128), an amount of L1 and L2 cache, and a bandwidth between L1 and L2. Libraries provide for general-purpose central processing units, and can also provide for special-purpose processors, such as graphics processing units, neural network tensor units, or fast Fourier transform unit. FPGA module 114 may have predetermined architectural parameters, irrespective of computer programs 118A-B processing requirements. Such modules include specialized DSPs, multi-port memory modules, FFTs, Quese and Stacks, Interleaver/Deinterleaver, LFSR, Delay, microcontrollers (e.g., Xilinx's picoblaz and microblaze), Reed-Solomon decoders, shifters, and time division multipliers. Accordingly, as will be discussed in more detail below, this may assist controller 120 select an appropriate FPGA group and FPGA identifier module 122 select an appropriate FPGA module.

Computer program module 116 is configured to process various computer programs 118A-B, which may be pre-stored on or received by computing device 102. As such, to be run, the computer programs 118A-B require operation by operating system 106, compiler 108, memory 110, CPU 112, and/or FPGA module 114 independently or collectively. As examples, we consider two programs A and B. Both programs have a nested for loop. In the first program, a memory read operation is performed before entering the loop. Inside the loop, many computational operations are performed using that data element, and once the program exits the nested loop, the result is stored in memory. In program B, there is a memory read and memory write operation in the nested loop. Clearly, program B has a much more memory-intensive nature than program A and can benefit from a large memory bandwidth or specialized memory modules, for example, dual-port memory modules in an FPGA. Program A can benefit from more Arithmetic/Logic Units (ALU) and cache units.

```
Program A:
    X = memoryRead (readMemoryAddress)
    for i from 0 to 100,000,000 {
        for j from 0 to 100,000,000 {
            X = X * i - j^2
        }
    }
    memory Write (writeMemoryAddress, X)
Program B:
    for i from 0 to 100,000,000 {
        for j from 0 to 100,000,000 {
            X = i - j^2 + memoryRead (readMemoryAddress + i)
            memory Write (writeMemoryAddress + i, X)
        }
    }
```

Figure 2:
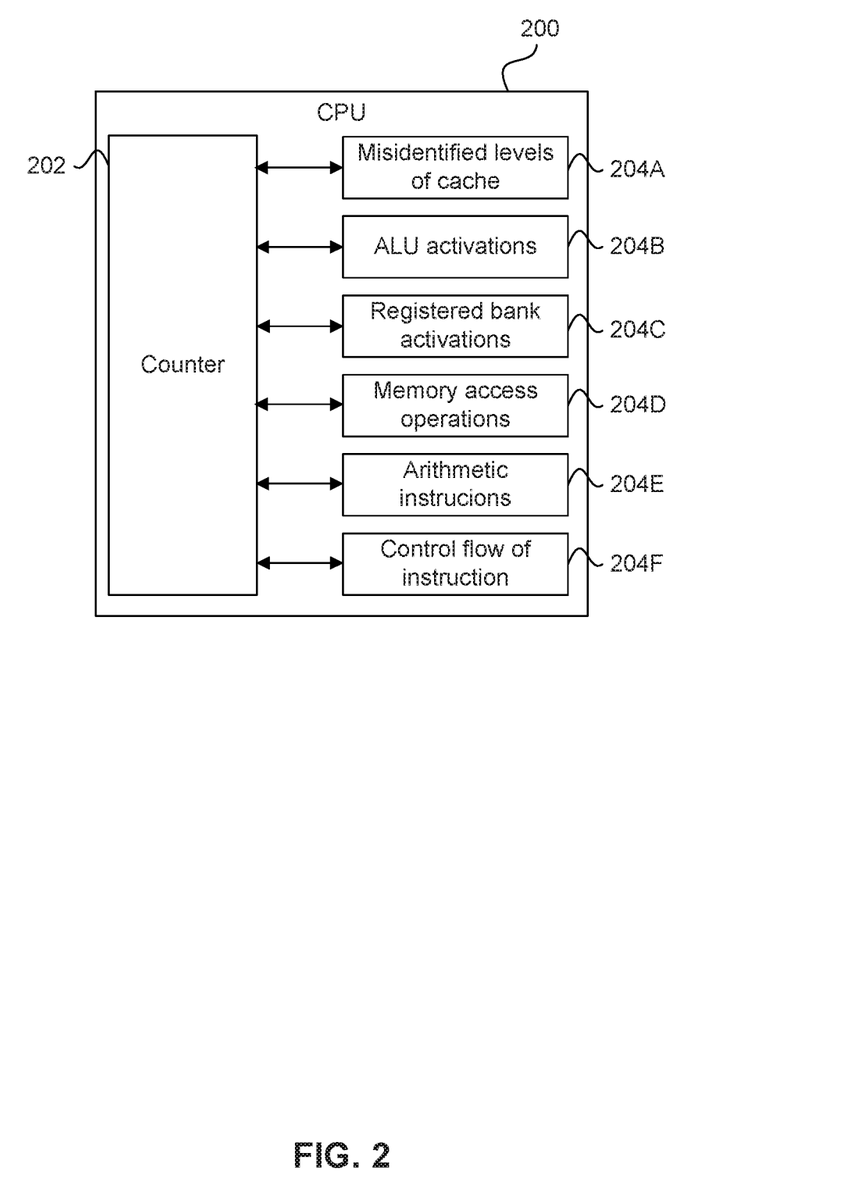
FIG. 2 illustrates an example control processing unit (CPU) of the computing device of FIG. 1, according to some embodiments.

FIG. 2 illustrates an example of CPU 200 of system 100 (of FIG. 1), according to some embodiments. CPU 200 includes counter 202 and modules 204A-F. Counter 202 tracks the number of times particular events or processes are performed by FPGA module 114 (of FIG. 1). Modules 204A-G stores different types of events and/or processes that are performed by FPGA module 114. For example, as illustrated, module 204A may store a misidentified levels of cache, module 204B may store a number of arithmetic logic unit activations (ALU), module 204C may store a number of registered bank activations, module 204D may store a number of memory access operations, module 204E may store a number of arithmetic instructions, and module 204F may store a control flow of instructions.

As such, upon receipt, counter 202 may identify the type of event and/or process, and then determine the number of such an event and/or process. Thereafter, counter 202 stores the event and/or process in the appropriate module 204A-F. For example, counter 202 may identify a type of event as an ALU activation and determine that such is the fifth ALU activation. Counter 202 may then store this information in ALU activations module 204AB.

Counter 202 may monitor the number of events and/or processes performed by FPGA module 114 (of FIG. 1) for a predetermined amount of time. The predetermined amount of time may be provided by an authorized operator, for example, of analyzing device 104 (of FIG. 1). As such, the predetermined amount of time may be static (e.g., 1 second, 10 seconds, and 30 seconds). Alternatively, the predetermined amount of time may be adaptive. For example, if computing program 118A (of FIG. 1) receives user input, the predetermined amount of time may equate to the receipt of a predetermined number of user inputs. Likewise, if computer program 118A requires communication with an external server (not illustrated), the predetermined amount of time may equate to performing a predetermined number and/or type of operations received from the external server.

Referring back to FIG. 1, as stated above, analyzing device 104 identifies an appropriate FPGA module unique to a particular computer program 118A of computing device 102 based on the computing device 102's workload properties in processing the computer program 118A. Analyzing device 104 includes controller 120 and FPGA identifier module 122. FPGA identifier module 122 receives data for a plurality of FPGA modules. The data may include workload properties and/or architecture of the FPGA modules. As such, FPGA identifier module 122 determines a plurality of classes of FPGA modules based on the workload properties and/or architecture of the FPGA modules.

Accordingly, controller 120 receives a plurality of classes from FPGA identifier module 122 and determines an appropriate class of FPGA module based workload properties of the computing device 102 in processing the computer program 118A. As will be described below, the appropriate class of the FPGA module may be based on the workload properties of computer program 118A or a specified function of computer program 118A. As such, in some embodiments, the appropriate FPGA module may support more memory or processing-intensive processors and/or may utilize an FFT, a neural network, a signal processing type, and an image processing unit. For example, as explained above, the controller 120 may receive workload properties associated with the computer program 118A indicating that the computer program is memory intensive and requires up to 32 bits of available memory. As such, the controller 120 may identify a class of FPGA modules that support memory-intensive computer programs, e.g., requiring 32 to 64 bits of memory.

After identifying the class of FPGA modules, in some embodiments, the controller 120 may select any available FPGA module from the class. However, in some embodiments, controller 120 may select an FPGA module from the class that meets or exceeds some or all of the remaining workload properties associated with the computer program. For example, as stated above, if the selected class of FPGA modules support memory-intensive computer programs, the selected FPGA module from that class may also support the memory-bandwidth requirements of the computer program (e.g., an amount of level-one and level-two cache memory). As such, unlike computing device 100's FPGA module 114, the selected FPGA module will be customized to the computer program.

Controller 120 may then request the selected FPGA module be programmed to implement the selected FPGA module into a computer architecture for processing the computer program 118A. The computer architecture may include a computing device 100's computer architecture/ components (i.e., operating system 106, compiler 108, memory 110, CPU 112, and computer program module 116) such that the selected FPGA module replaces FPGA module 114. Alternatively, the computer architecture may be a new computer architecture. The new computer architecture includes components having at least the same capability as computing device 100's components. For example, the new computer architecture's memory and CPU will have at least the same storage capability and processing power as computing device 100's memory 110 and CPU 112, respectively. As such, the selected FPGA module's computer architecture will also be customized to the computer program. In turn, the computer architecture will process the computer program 118A more efficiently than the computing device 100's computer architecture that included FPGA module 114.

Figure 3:
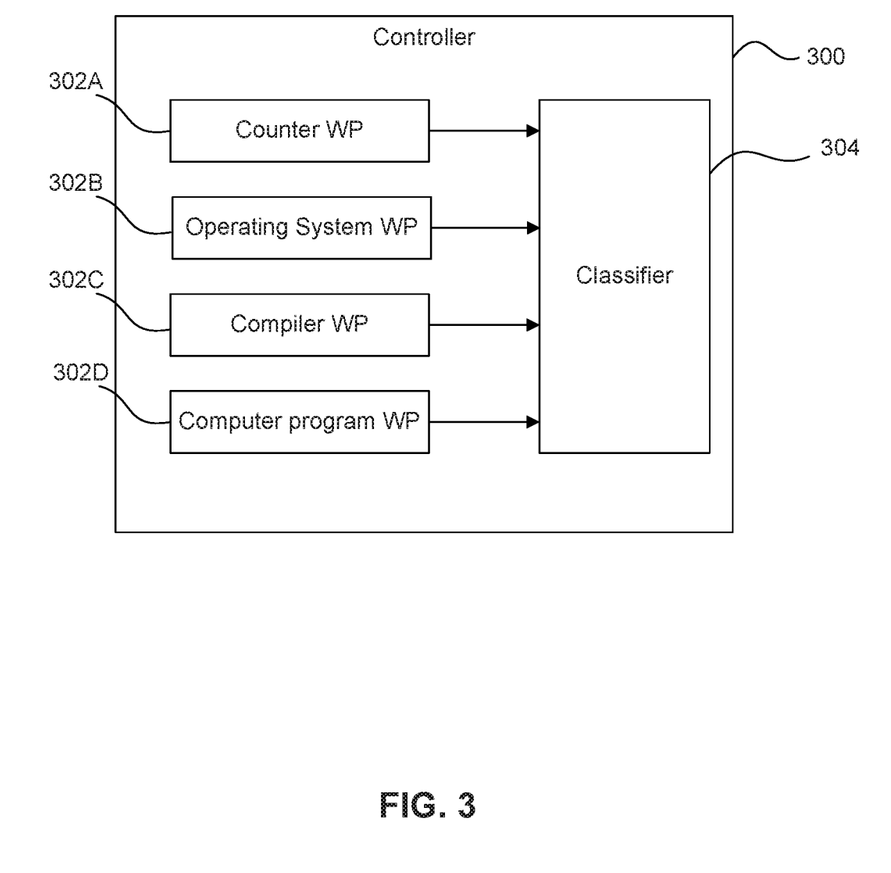
FIG. 3 illustrates an example controller of the analyzing device of FIG. 1, according to some embodiments.

FIG. 3 illustrates an example of controller 300 of the analyzing device 104 of FIG. 1, according to some embodiments. Controller 300 includes modules 302A-D and classifier 304. Modules 302A-D are configured to receive, monitor, and track workload properties from computing device 102 in processing computer program 118A (of FIG. 1). As discussed above, the workload properties may relate to operating system 106, compiler 108, CPU 112, and computer programs 118A-B (of FIG. 1). Accordingly, as illustrated, module 302A may receive, monitor, and track work properties of CPU 112 (of FIG. 1) directly therefrom or through counter 202 (of FIG. 2). As such, module 302A's CPU 112-related work properties may include a number of misidentified levels of cache, a number of ALU activations, a number of registered bank activations, a number of memory access operations, a number of arithmetic instructions, and a control flow of an instruction, just to provide a few examples.

Module 302B may receive, monitor, and track work properties of operating system 106 (of FIG. 1). As such, module 302B's operating system 106-related work properties may include an amount of processed computer program 118A (of FIG. 1) operations and an amount of memory utilized in processing computer program 118A (of FIG. 1) operations, just to provide a few examples. Module 302C may receive, monitor, and track the work properties of compiler 108 (of FIG. 1). Hence, module 302C's compiler 108-related work properties may include, for example, an amount of memory to maintain (e.g., store) computer program 118A. The amount of memory may be illustrated prior to computer device 100 (of FIG. 1) processing the computer program 118A. Module 302C's compiler 108-related workload properties 302C may also include data of what compiler 108 is attempting to perform with the instructions of computer program 118A (of FIG. 1) or is performing with the instructions of computer program 118A. Module 302D may receive, monitor, and track properties of computer programs 118A. Thus, module 302D's computer program 118A-related work properties may include an amount of memory required for certain operations, a number of operations needing processing at designated times, and a required bandwidth per operation, just to provide a few examples.

As such, classifier 304 receives workload properties from modules 302A-D for computer program 118A (of FIG. 1) and selects one of a plurality of predetermined classes of FPGA modules based on the received workload properties. In some embodiments, classifier 304 receives CPU 112 (of FIG. 1)-related workload properties and/or compiler 108 (of FIG. 1)-related workload properties from modules 302A and 302C, respectively. The classifier 304 may augment the CPU 112 (of FIG. 1)-related workload properties and/or compiler 108 (of FIG. 1)-related workload properties with additional workload properties associated with the computing device 100 (of FIG. 1) processing computer program 118. The additional workload properties may permit analyzing device 104 to determine a more suitable FPGA module for the computer program 118A.

In some embodiments, instead of CPU 112 (of FIG. 1)-related workload properties, classifier 304 may receive compiler 108 (of FIG. 1)-related work properties. For example, in some instances, compiler 108 may be unsuccessfully processing operations of computer program 118A. As such, compiler 108 may be unaware of whether CPU 112 has accelerated hardware and utilizes a specific algorithm to processes computer program 118A's operations. Thus, classifier 304 receives CPU 112 (of FIG. 1)-related workload properties from module 302A and optionally receives compiler 108 failure to process computer program 118A operation from module 302C.

However, if compiler 108 (of FIG. 1) is successfully processing operations of computer program 118A (of FIG. 1), compiler 108 may be aware that CPU 112 (of FIG. 1) has accelerated hardware and utilizes a specialized algorithm. Examples of specialized algorithms include, but are not limited to, a fast Fourier transform (FFT), image processing, deep learning and neural network tensor modules. Accordingly, via compiler 108 (of FIG. 1)-related work properties, classifier 304 may receive an identity of computer program 118A or accurate requirements for processing computer program 118A. As such, classifier 304 need not receive CPU 112 (of FIG. 1)-related workload properties.

As explained above, classifier 304 then selects one of a plurality of classes of FPGA modules based on the workload properties received from modules 302A-D. The classes of FPGA modules may be grouped based on a particular workload property of the computer program 118A (of FIG. 1). For example, a first class of FPGA modules may be capable of supporting memory-intensive computer programs, and a second class of FPGA modules may be capable of heightened computational requirements. Moreover, the classes of FPGA modules may be grouped based on a particular specialized function of the computer program 118A (of FIG. 1).

Along these lines, although the class of FPGA modules is directed to a particular workload property, the FPGA modules within may have different workload properties. For example, the FPGA modules within the class capable of supporting memory-intensive computer programs may have different amounts of memory and computational power.

Thus, after selecting a class of FPGA modules, the classifier 304 may select a particular FPGA module in that the class that meets or exceeds the requirements of the remaining computer program 118A's workload properties (e.g., processing power).

Moreover, classifier 304 may identify an appropriate class of FPGA modules by utilizing a machine learning model. The machine learning model may be trained via supervised learning, semi-supervised learning, unsupervised learning, and/or reinforced learning. In some embodiments, classifier 304 may utilize clustering (e.g., k-means clustering) as a means of an unsupervised learning method. Classifier 304 may also utilize support vector machines, deep learning, and neural network, just to provide a few other machine learning algorithm examples. Thereafter, an authorized user (e.g., of analyzing device 104) may select and/or confirm an appropriate class of FPGA modules.

Figure 4:
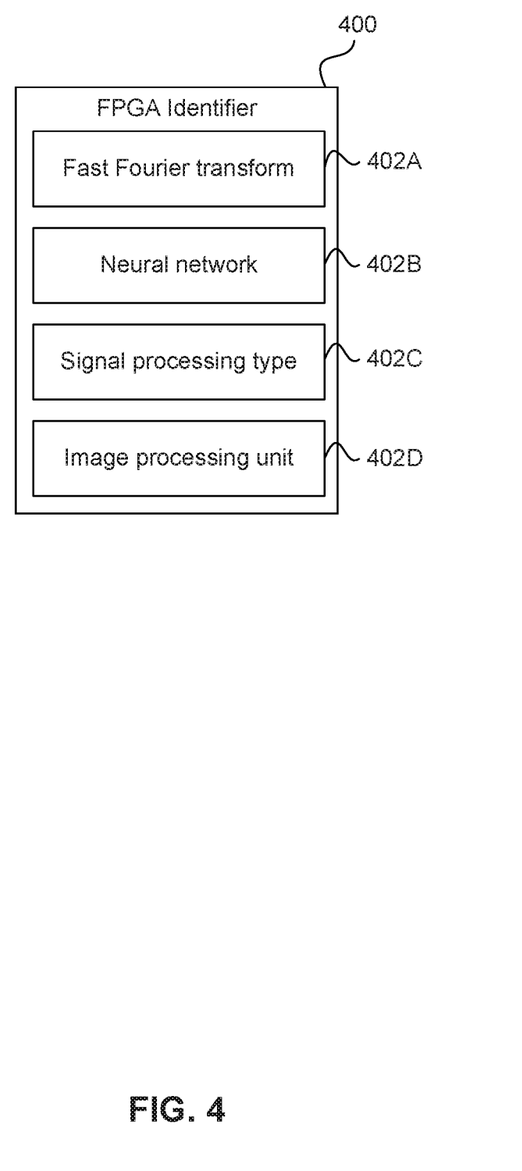
FIG. 4 illustrates an example FPGA identifier module of the analyzing device of FIG. 1, according to some embodiments.

FIG. 4 illustrates an example FPGA identifier module 400 of analyzing device 104 of FIG. 1, according to some embodiments. As stated above, FPGA identifier module 400 maintains different classes of FPGA modules 402A-D. The classes of FPGA modules may be based on different possible combinations of workload properties and/or specified functions of computer programs. For example, as illustrated, the classes of FPGA modules 402A-D may include those utilizing a FFT, a neural network, a signal processing type, and an image processing unit.

Along these lines, FPGA modules are made up of configurable logic blocks (CLBs), configurable input/output blocks (I/O cells), programmable interconnect, clock circuitry, and/or logic resources (e.g., arithmetic logic units (ALUs), memory, and/or decoders). Accordingly, each class of FPGA modules and/or each FPGA module with each class may have different architecture and/or configured/programmed components (e.g., CLBS, I/O cells, and/or interconnect). As such, the FPGA modules are structurally configured and/or programmed with the appropriate components for a particular computer program.

Figure 5:
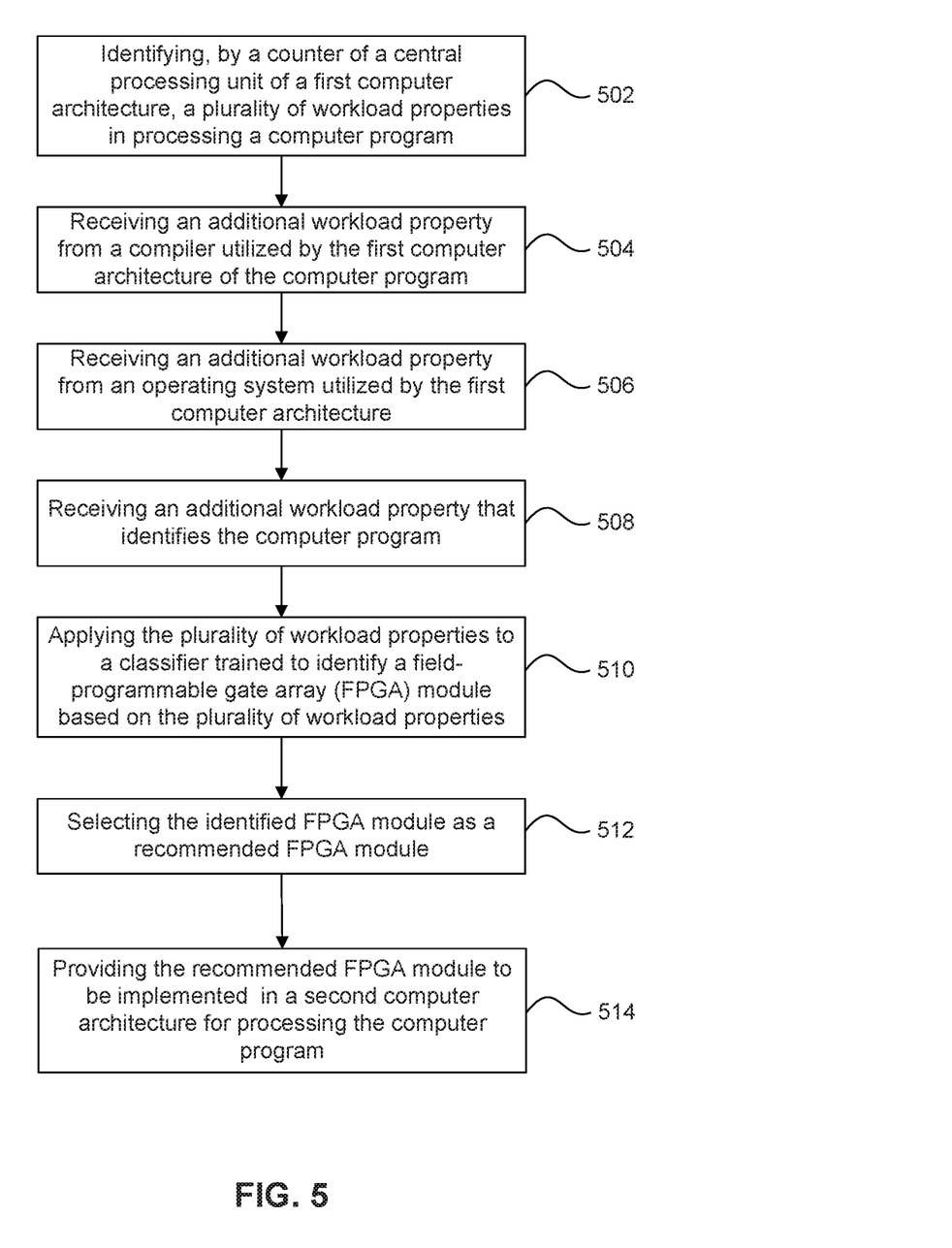
FIG. 5 illustrates a flowchart of an example method for identifying an appropriate FPGA module for a computer program, according to some embodiments.
Figure 6:
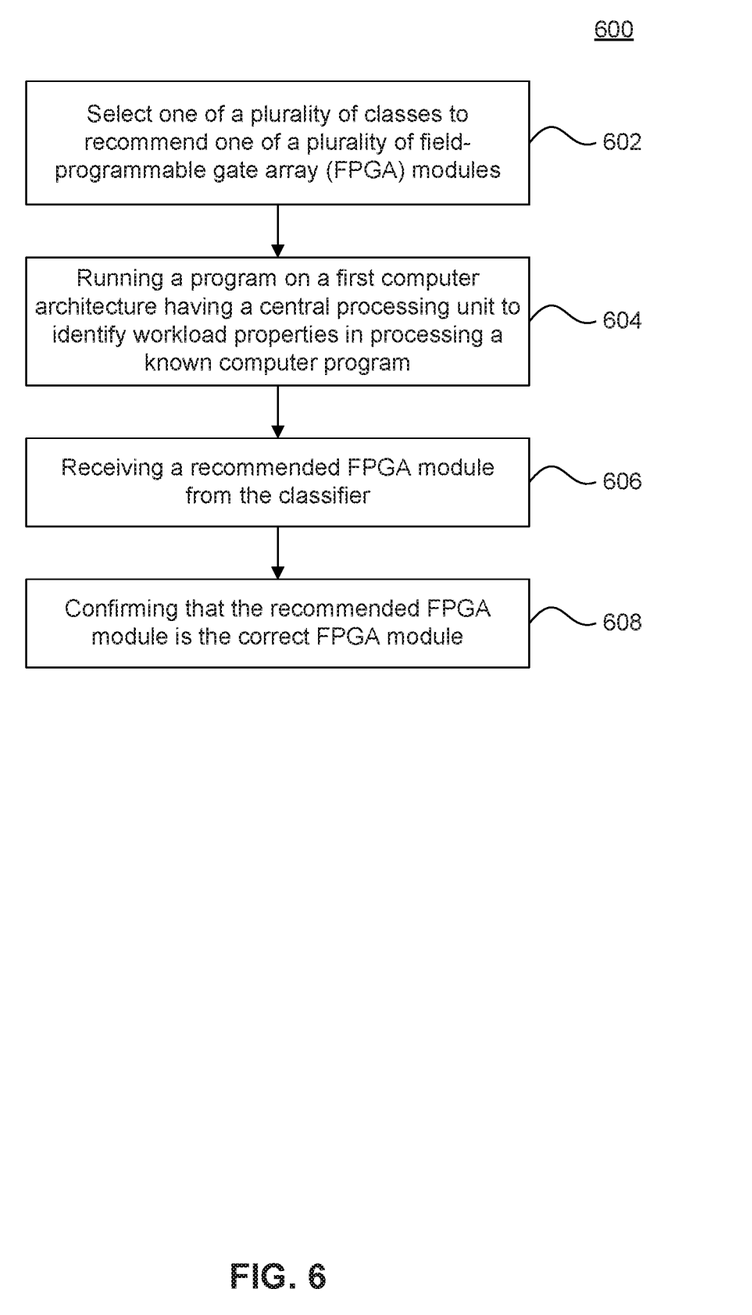
FIG. 6 illustrates a flowchart of an example method for training a classifier for identifier an appropriate FPGA module for a computer program, according to some embodiments.

FIG. 5 illustrates a flowchart of a method 500 for identifying an appropriate FPGA for a computer program, according to some embodiments. FIG. 6 illustrates a flowchart of a method 600 for training a classifier for identifying an appropriate FPGA classification, according to some embodiments. Method 500/600 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously or in a different order than shown in FIGS. 4 and 5, as will be understood by a person of ordinary skill in the art.

Referring now to FIG. 5, method 500 shall be described with reference to FIGS. 1-3. However, method 500 is not limited to those example embodiments.

In 502, computing device 102's CPU 112 identifies workload properties in processing a computer program 118A. The workload properties describe the performance of the computer and structure of a central processor in a first computer architecture. The CPU 200's counter 202 may track and/or count the workload properties and store them in their associated modules 204A-F.

In 504, analyzing device 104 receives an additional workload property from a compiler 108 utilized by the first computer architecture. Compiler 108-related work properties may include, for example, an amount of memory to maintain (e.g., store) computer program 118A. The amount of memory may be illustrated prior to computer device 100 (of FIG. 1) processing the computer program 118A. In some embodiments, compiler 108 may be a just-in-time compiler, an ahead-of-time compiler, a source-to-source compiler, and a dynamic compiler.

In 506, analyzing device 104 receives an additional workload property from an operating system 106 utilized by the first computer architecture. Operating system 106-related work properties may include an amount of processed computer program 118A operations and an amount of memory utilized in processing computer program 118A operations, just to provide a few examples.

In 508, computing device 102 receives an additional workload property that identifies the computer program 118A. Computer program 118A-related work properties may include an amount of memory required for certain operations, a number of operations needing processing at designated times, and a required bandwidth per operation, just to provide a few examples In some embodiments, 504-508 are optional.

In 510, analyzing device 104 applies the workload properties to classifier 304 trained to identify a field-programmable gate array (FPGA) module based on the plurality of workload properties. In some embodiments, analyzing device 104's classifier 304 receives CPU 112-related workload properties and/or compiler 108-related workload properties. Classifier 304 may augment the CPU 112-related workload properties and/or compiler 108-related workload properties with additional workload properties associated with the computing device 100 processing computer program 118.

In 512, analyzing device 104 selects the identified FPGA module as a recommended FPGA module. The classes of FPGA modules may be grouped based on a particular workload property of the computer program 118A.

In 514, analyzing device 104 provides the recommended FPGA module to be implemented in a second computer architecture for processing the computer program 118A. The second computer architecture may include all the components of the first computer architecture running computer program 118 except for FPGA module 114A. Alternatively, the second computer architecture may include new components having at least equal capabilities as the first computer architecture components.

Referring now to FIG. 6, method 600 shall be described with reference to FIGS. 1, 3 and 4. However, method 600 is not limited to those example embodiments.

In 602, controller 120 selects one of a plurality of classes of FPGA modules 402A-D to recommend one of a plurality of FPGA modules. The classes of FPGA modules 402A-D may be based on different possible combinations of workload properties and/or specified functions of computer programs. As illustrated, the classes of FPGA modules 402A-D may include those utilizing a FFT, a neural network, a signal processing type, and an image processing unit.

In 604, controller 120/300 receives workload properties of a CPU 112/300 running a computer program 118A on a first computer architecture having the central processing unit 112. The workload properties may relate to one or more of CPU 112, compiler 108, operating system 106, and/or computer program 118A, as discussed above in 502-508.

In 606, controller 120 determines a recommended class of FPGA modules 402A. In some embodiments, controller 120 applies the workload properties to classifier 403 to identify the recommended FPGA module based on the workload properties.

In 606, controller 120 confirms that the recommended class of FPGA modules 402A is an appropriate class of FPGA modules. If confirmed, controller 120 can register such as being accurate. If the recommended class does not match the appropriate class, controller 120 can register, such as being inaccurate. Thereafter, controller 120 can register the workload properties as being indicative of the appropriate class for the future selection of a recommended class. As such, in either scenario, controller 120 can utilize machine learning techniques to improve the recommendation of appropriate FPGA modules.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments but should be defined only in accordance with the following claims and their equivalents.

What is claimed is:

1. A computer-implemented method, comprising:
receiving, from a counter of a central processing unit of a first computer architecture, a plurality of workload properties in processing a computer program, the properties describing a performance of the computer program and a structure of the central processing unit;
applying the plurality of workload properties to a classifier trained to identify a field-programmable gate array (FPGA) module based on the plurality of workload properties;
identifying a recommended FPGA module from the classifier;
providing the recommended FPGA module to be implemented in a second computer architecture for processing the computer program, whereby the second computer architecture is able to perform the computer program more efficiently than the first computer architecture;
confirming that the recommended FPGA module is selected from an appropriate class of FPGA modules grouped together based on at least one of the plurality of workload properties; and registering that the appropriate class of FPGA modules as an accurate selection for processing the computer program.

2. The computer-implemented method of claim 1, further comprising:
receiving, from a compiler of the first computer architecture, an additional workload property,
wherein the applying comprises applying the additional workload property.

3. The computer-implemented method of claim 2, wherein the compiler is a Just-In-Time (JIT) compiler.

4. The computer-implemented method of claim 1, further comprising:
receiving, from an operating system of the first computer architecture, an additional workload property,
wherein:
the additional workload property describes the performance of the computer program in the operating system, and
the applying comprises applying the additional workload property.

5. The computer-implemented method of claim 1, wherein:
the FPGA module is selected from a plurality of FPGA modules, and
the counter is configured to select from the plurality of FPGA modules based on the plurality of workload parameters.

6. The computer-implemented method of claim 5, further comprising:
receiving, from the counter of the central processing unit of the first computer architecture, a second plurality of workload properties in processing another computer program;
applying the second plurality of workload properties to the classifier;
identifying a second recommended FPGA module from the classifier; and
providing the second recommended FPGA module to be implemented in a third computer architecture for processing the second computer program, whereby the third computer architecture is able to perform the second computer program more efficiently than the first computer architecture.

7. The computer-implemented method of claim 5, wherein the plurality of FPGA modules are each configured for supporting different one of a plurality of classes of computation.

8. The computer-implemented method of claim 7, wherein the plurality of classes of computation includes a memory-bandwidth optimization, a computational-density optimization, and a specialized function.

9. The computer-implemented method of claim 8, wherein the plurality of classes of computation is a plurality of specialized functions including one or more of a fast fourier transform, a neural network, a type of signal processing, and an image processing unit.

10. The computer-implemented method of claim 1, wherein each of the plurality of workload properties is a number of misidentified levels of cache, a number of arithmetic logic unit activations, a number of registered bank activations, a number of memory access operations, a type of arithmetic instructions, or a control flow of instruction.

11. The computer-implemented method of claim 1, wherein:
the first computer architecture is utilized prior to deployment of the computer program, and
the second computer architecture is deployed to be utilized for processing the computer program.

12. The computer-implemented method of claim 1, further comprising:
receiving an additional workload property that identifies the computer program,
the additional workload property is one of the plurality of workload properties, and
wherein the applying comprises applying the additional workload property.

13. A non-transitory computer-readable storage device having instructions stored thereon, execution of which, by one or more processing devices, causes the one or more processing devices to perform operations, the operations comprising:
receiving, from a counter of a central processing unit of a first computer architecture, a plurality of workload properties in processing a computer program, the properties describing a performance of the computer program and structure of the central processing unit;
applying the plurality of workload properties to a classifier trained to identify a field-programmable gate array (FPGA) module based on the plurality of workload properties;
receiving a recommended FPGA module from the classifier;
implementing the recommended FPGA module in a second computer architecture for processing the computer program, whereby the second computer architecture is able to perform the computer program more efficiently than the first computer architecture;
confirming that the recommended FPGA module is selected from an appropriate class of FPGA modules grouped together based on at least one of the plurality of workload properties; and
registering that the appropriate class of FPGA modules as an accurate selection for processing the computer program.

14. The non-transitory computer-readable storage device of claim 13, the operations further comprising:
receiving, from a compiler of the computer program, an additional workload wherein the applying comprises applying the additional workload property.

15. The non-transitory computer-readable storage device of claim 13, the operations further comprising:
receiving, from an operating system utilized by the first computer architecture an additional workload, wherein:
the additional workload property describes the performance of the computer program in the operating,
the applying comprises applying the additional workload property,
the FPGA module is selected from a plurality of FPGA modules, and
the classifier is configured to select from the plurality of FPGA modules based on the plurality of workload parameters.

16. The non-transitory computer-readable storage device of claim 13, the operations further comprising:
receiving, from the counter of the central processing unit of the first computer architecture, a second plurality of workload properties in processing another computer program;
applying the second plurality of workload properties to the classifier;
receiving a second recommended FPGA module from the classifier; and implementing the second recommended FPGA module in a third computer architecture for processing the second computer program, whereby the third computer architecture is able to perform the second computer program more efficiently than the first computer architecture, wherein:
   the plurality of FPGA modules are each configured for supporting different one of a plurality of classes of computation, and
   the plurality of classes of computation includes a memory-bandwidth optimization, a computational-density optimization, and a specialized function.

17. The non-transitory computer-readable storage device of claim 13, wherein each of the plurality of workload properties are a number of misidentified levels of cache, a number of arithmetic logic unit activations, a number of registered bank activations, a number of memory access operations, a type of arithmetic instructions, or a control flow of an instruction.

18. The computer-readable storage device of claim 13, the operations further comprising:
   receiving an additional workload property that identifies the computer program, wherein the additional workload property is one of the plurality of workload properties, wherein the applying comprises applying the additional workload property.

19. A system, comprising:
   a memory configured to store operations; and
   one or more processors configured to perform the operations, the operations comprising:
     receiving, from a counter of a central processing unit of a first computer architecture, a plurality of workload properties in processing a computer program, the properties describing a performance of the computer program and structure of the central processing unit;
     applying the plurality of workload properties to a classifier trained to identify a field-programmable gate array (FPGA) module based on the plurality of workload properties;
     identifying a recommended FPGA module from the classifier;
     providing the recommended FPGA module to be implemented in a second computer architecture for processing the computer program, whereby the second computer architecture is able to perform the computer program more efficiently than the first computer architecture;
     confirming that the recommended FPGA module is selected from an appropriate class of FPGA modules grouped together based on at least one of the plurality of workload properties; and
     registering that the appropriate class of FPGA modules as an accurate selection for processing the computer program.

20. The computer-implemented method of claim 1, wherein:
   the appropriate class of FPGA modules comprises the recommend FPGA module and a second FPGA module,
   when implemented in the second computer architecture, the recommended FPGA module is able to perform the computer program more efficiently than the second FPGA module.

\* \* \* \* \*